United States Patent
Li et al.

(10) Patent No.: US 11,861,428 B2
(45) Date of Patent: Jan. 2, 2024

(54) SERVICE ORCHESTRATION METHOD, APPARATUS AND DEVICE FOR PHYSICAL MACHINE, AND STORAGE MEDIUM

(71) Applicant: INSPUR SUZHOU INTELLIGENT TECHNOLOGY CO., LTD., Jiangsu (CN)

(72) Inventors: Dong Li, Jiangsu (CN); Kaiyuan Qi, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/012,922

(22) PCT Filed: Feb. 20, 2021

(86) PCT No.: PCT/CN2021/076972
§ 371 (c)(1),
(2) Date: Dec. 25, 2022

(87) PCT Pub. No.: WO2022/001135
PCT Pub. Date: Jan. 6, 2022

(65) Prior Publication Data
US 2023/0267023 A1    Aug. 24, 2023

(30) Foreign Application Priority Data
Jun. 30, 2020   (CN) .......................... 202010614692.4

(51) Int. Cl.
*G06F 9/54*    (2006.01)
*G06F 9/50*    (2006.01)

(52) U.S. Cl.
CPC ............ *G06F 9/547* (2013.01); *G06F 9/5027* (2013.01)

(58) Field of Classification Search
None
See application file for complete search history.

(56) References Cited

U.S. PATENT DOCUMENTS 7,356,679 B1 *  4/2008  Le .......................... G06F 16/116
                                                        713/1
10,228,959 B1    3/2019  Anderson et al.
(Continued)

FOREIGN PATENT DOCUMENTS

CN   105975277 A   9/2016
CN   107659439 A   2/2018
(Continued)

OTHER PUBLICATIONS

"Ironic/NovaBaremetalIronicMigration—OpenStack" posted at <https://wiki.openstack.org/wiki/Ironic/NovaBaremetalIronicMigration> on Mar. 8, 2016 (Year: 2016).*
(Continued)

*Primary Examiner* — Scott B Christensen
(74) *Attorney, Agent, or Firm* — IPro, PLLC

(57) ABSTRACT

A service orchestration method, apparatus and device for a physical machine, and a computer-readable storage medium. The method includes: creating a physical machine resource that inherits all attributes of a cloud host, and modifying the physical machine resource according to characteristics of a target physical machine to obtain a target physical machine resource; configuring an underlying driver of Ironic according to the characteristics of a target physical machine; and invoking the Ironic by means of nova, such that the target physical machine resource is used to perform service orchestration on the target physical machine when the Ironic is running. On the basis of implementing service orchestration on a physical machine, the target physical machine resource in the method is obtained by inheriting all attributes of a
(Continued)

cloud host and performing modification according to the characteristics of a target physical machine.

18 Claims, 2 Drawing Sheets

(56) References Cited

U.S. PATENT DOCUMENTS

| | | | |
|---|---|---|---|
| 2006/0010176 A1* | 1/2006 | Armington | G06F 9/4856 |
| 2009/0094603 A1* | 4/2009 | Hiltgen | G06F 9/45558 |
| | | | 718/1 |
| 2009/0113423 A1* | 4/2009 | Hiltgen | G06F 9/45558 |
| | | | 718/1 |
| 2013/0191347 A1* | 7/2013 | Bensinger | G06F 11/2097 |
| | | | 707/649 |
| 2014/0137244 A1* | 5/2014 | Banerjee | H04L 63/00 |
| | | | 726/22 |
| 2018/0024851 A1 | 1/2018 | Barker et al. | |

FOREIGN PATENT DOCUMENTS

| | | |
|---|---|---|
| CN | 109684074 A | 4/2019 |
| CN | 109871680 A | 6/2019 |
| CN | 111274033 A | 6/2020 |
| CN | 111858037 A | 10/2020 |

OTHER PUBLICATIONS

CodeAs. "Openstack-Ironic Abstract." https://blog.csdn.net/codeaswind/article/details/104699260. Mar. 6, 2020.
PCT/CN2021/076972 international search report.
CN 202010614692.4 first office action.

* cited by examiner

SERVICE ORCHESTRATION METHOD, APPARATUS AND DEVICE FOR PHYSICAL MACHINE, AND STORAGE MEDIUM

CROSS-REFERENCE TO RELATED APPLICATION

The present disclosure claims the priority of Chinese patent application filed on Jun. 30, 2020 before the CNIPA, China National Intellectual Property Administration with the application number of 202010614692.4 and the title of "SERVICE ORCHESTRATION METHOD, APPARATUS AND DEVICE FOR PHYSICAL MACHINE, AND STORAGE MEDIUM", which is incorporated herein in its entirety by reference.

FIELD

The present disclosure relates to the field of service orchestration and, more particularly, to a service orchestration method, device and apparatus of a physical machine and a computer-readable storage medium.

BACKGROUND

OpenStack is an open source project for providing cloud services for clients, is used for completing related work of the cloud services by several main assemblies such as a calculation assembly, a mirror assembly, a storage assembly, a network assembly and the like, and aims to provide a cloud computing management platform which is simple in implementation, may be extended on a large scale, is rich in functions and uniform in standard for global billions of users. But, in some application scenes, only virtualized services are not enough, the users may need to use a physical server resource directly to meet the feasibility and high efficiency of requirements, and therefore, OpenStack needs to be utilized for supporting a direct deployment function of a physical machine, i.e., service orchestration needs to be performed for the physical machine. Service orchestration refers to that configuration information is preset for a virtual machine/the physical machine to perform resource configuration according to the configuration information subsequently.

In the prior art, a manner of realizing service orchestration for a target physical machine refers to that related resources are set for services of the target physical machine firstly, corresponding target physical machine resources are set according to attributes corresponding to all the related resources, and service orchestration is performed for the target physical machine according to the target physical machine resources; and a rest api request and service interaction of the target physical machine are sent by an Ironic client to complete basic create, read, update and delete (CRUD) operations, so as to achieve the effect of deploying the target physical machine. However, as the process of setting the resources is high in complexity, a lot of human resources, time and energy need to be consumed in the setting process, and some set attributes may affect related functions of other cloud hosts, so that the system stability is low.

Therefore, how to improve the convenient level of service orchestration for the physical machine and guarantee the system stability on the basis of realizing service orchestration for the physical machine is the technical problem to be solved by those skilled in the art at present.

SUMMARY

In view of this, an object of the present disclosure aims to provide a service orchestration method of a physical machine, which may improve the convenient level of service orchestration for the physical machine and guarantee the system stability on the basis of realizing service orchestration for the physical machine; and another object of the present disclosure also aims to provide a service orchestration device and apparatus of the physical machine, and a computer-readable storage medium, which have the above beneficial effects.

In order to solve the above technical problems, the present disclosure provides the service orchestration method of the physical machine, which includes:

creating a physical machine resource inheriting all attributes of a cloud host, and modifying the physical machine resource according to features of a target physical machine to obtain a target physical machine resource;

configuring a bottom driver of Ironic according to the features of the target physical machine; and invoking Ironic by nova to perform service orchestration for the target physical machine by utilizing the target physical machine resource when Ironic operates.

In an embodiment, the process of creating the physical machine resource inheriting all attributes of the cloud host, and modifying the physical machine resource according to the features of the target physical machine to obtain the target physical machine resource includes:

creating the physical machine resource inheriting all attributes of the cloud host; and modifying the physical machine resource according to the features of the target physical machine, and rewriting a handle_create method, a handle_suspend and handle_resume method and a check_suspend_complete and check_resume_complete method to obtain the target physical machine resource.

In an embodiment, before invoking Ironic by nova to perform service orchestration for the target physical machine by utilizing the target physical machine resource when Ironic operates, the method further includes:

a step of performing identity verification for a invoke instruction sent for nova by Ironic, and invoking Ironic by nova after identity verification passes to perform service orchestration for the target physical machine by utilizing the target physical machine resource when Ironic operates.

In an embodiment, after invoking Ironic by nova to perform service orchestration for the target physical machine by utilizing the target physical machine resource when Ironic operates, the method further includes:

setting label information for the target physical machine completing service orchestration.

In an embodiment, after invoking Ironic by nova to perform service orchestration for the target physical machine by utilizing the target physical machine resource when Ironic operates, the method further includes:

writing an operation record of performing service orchestration for the target physical machine into an operation log.

In an embodiment, after invoking Ironic by nova to perform service orchestration for the target physical machine by utilizing the target physical machine resource when Ironic operates, the method further includes:

displaying configuration information corresponding to service orchestration for the target physical machine.

In an embodiment, after invoking Ironic by nova to perform service orchestration for the target physical machine by utilizing the target physical machine resource when Ironic operates, the method further includes:

sending corresponding prompt information.

In order to solve the above technical problems, the present disclosure also provides the service orchestration device of the physical machine, which includes:

a creating module configured for creating the physical machine resource inheriting all attributes of the cloud host, and modifying the physical machine resource according to the features of a target physical machine to obtain the target physical machine resource;

a configuration module configured for configuring the bottom driver of Ironic according to the features of the target physical machine; and an execution module configured for invoking Ironic by nova to perform service orchestration for the target physical machine by utilizing the target physical machine resource when Ironic operates.

In order to solve the above technical problems, the present disclosure also provides the service orchestration apparatus of the physical machine, which includes:

a memory configured for storing computer programs; and a processor configured for implementing the steps of any service orchestration method of the physical machine when executing the computer programs.

In order to solve the above technical problems, the present disclosure also provides the computer-readable storage medium; the computer programs are stored on the computer programs; and the computer programs are executed by a processor to implement the steps of any service orchestration method of the physical machine.

The service orchestration method of the physical machine, which is provided by the present disclosure, includes: creating the physical machine resource inheriting all attributes of the cloud host, and modifying the physical machine resource according to the features of the target physical machine to obtain the target physical machine resource; configuring the bottom driver of Ironic according to the features of the target physical machine; and invoking Ironic by nova to perform service orchestration for the target physical machine by utilizing the target physical machine resource when Ironic operates. Ironic is a project of performing service orchestration for the physical machine in OpenStack, and Ironic is invoked by nova to perform service orchestration for the target physical machine by utilizing the target physical machine resource when Ironic operates, thereby realizing service orchestration for the physical machine; in addition, compared with a method of setting the target physical machine resource in the prior art, the target physical machine resource in the method of the present disclosure is obtained by inheriting all attributes of the cloud host, and modifying the physical machine resource according to the features of the target physical machine, thereby greatly omitting design details of setting the target physical machine resource and simplifying the setting process; and as the attributes of the cloud host are inherited, orchestration for related functions of the cloud host is not affected, and the system stability is guaranteed relatively.

In order to solve the above technical problems, the present disclosure also provides the service orchestration device and apparatus of the physical machine, and the computer-readable storage medium, which have the above beneficial effects.

BRIEF DESCRIPTION OF THE DRAWINGS

In order to more clearly explain the technical solution in the embodiment or the existing technology of the present disclosure, the following will briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

In order that a person skilled in the art may understand the technical solution better in the present disclosure, a more complete description of the embodiments of the present disclosure will be rendered by reference to the appended drawings, which are provided for purposes of illustration and are not intended to be exhaustive of or limiting the present disclosure. All the other embodiments obtained by a person of ordinary skill in the art based on the embodiments in the present application without involving any inventive effort shall fall within the scope of the present application.

The core of the embodiments of the present disclosure is to provide a service orchestration method of a physical machine, which may improve the convenient level of service orchestration for the physical machine and guarantee the system stability on the basis of realizing service orchestration for the physical machine; and the other core of the present disclosure is to provide a service orchestration device and apparatus of the physical machine, and a computer-readable storage medium, which have the above beneficial effects.

In order that those skilled in the art may understand the solution of the present disclosure better, the present disclosure is further described in details hereinafter through combination with the drawings and implementation manners.

Figure 1:
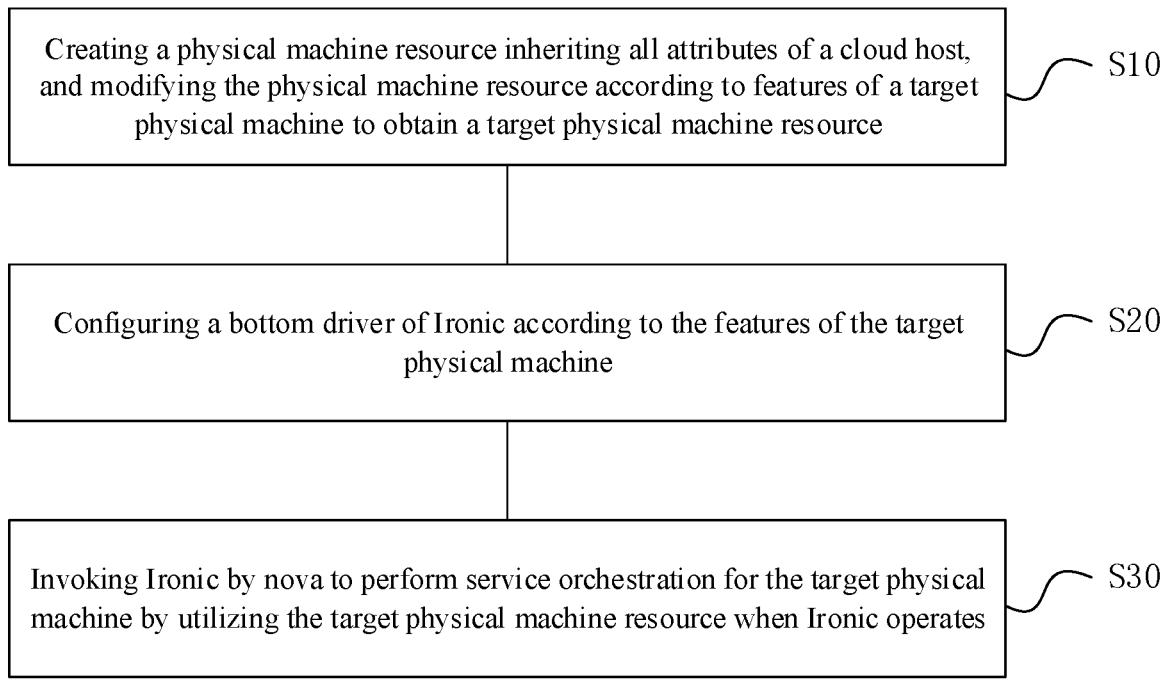
FIG. 1 is a flow chart of a service orchestration method of a physical machine, which is provided by an embodiment of the present disclosure.
Figure 2:
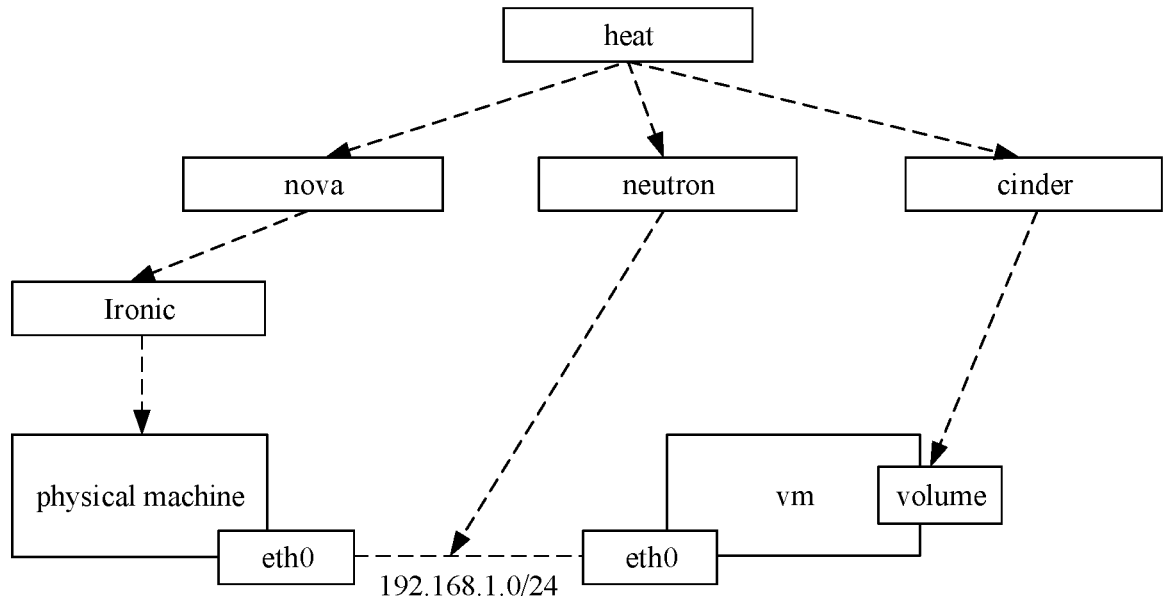
FIG. 2 is a schematic structural diagram of a system framework for realizing service orchestration based on OpenStack, which is provided by an embodiment of the present disclosure.

FIG. 1 is a flow chart of a service orchestration method of a physical machine, which is provided by an embodiment of the present disclosure; and FIG. 2 is a schematic structural diagram of a system framework for realizing service orchestration based on OpenStack, which is provided by an embodiment of the present disclosure. As shown in FIG. 1 and FIG. 2, the service orchestration method of the physical machine includes:

S10: creating a physical machine resource inheriting all attributes of a cloud host, and modifying the physical machine resource according to features of a target physical machine to obtain a target physical machine resource;

S20: configuring a bottom driver of Ironic according to the features of the target physical machine; and S30: invoking Ironic by nova to perform service orchestration for the target physical machine by utilizing the target physical machine resource when Ironic operates.

Firstly, it needs to be noted that OpenStack, which is an open source project of a cloud computing management platform, aims to provide open source projects of software for construction and management of public and private clouds; in FIG. 2, Ironic is a product form of providing a computing resource for a user in the field of cloud computing, is a private computing resource and is different from that a virtualized computing resource is established on a shared hardware resource, and the computing of the user is performed in a manner of directly accessing the hardware resource; Heat, i.e. service orchestration, is a service for choreographing composite cloud application based on a template and is also a project of an OpenStack open source community; Cinder is an assembly for providing a block storage service in OpenStack and is mainly configured for providing a virtual disk for an example of a virtual machine; and Neutron is a core assembly for providing a network service in OpenStack, is configured for realizing software network resource management based on a thought of a software defined network (SDN), fully utilizes various network related technologies in a Linux system and supports a third-party plug-in.

A physical machine resource OS:Nova:Host is created firstly. The physical machine resource inherits all attributes of the cloud host, belongs to a computing nova module, and inherits all attributes of the cloud host from OS:Nova: Server, so that the physical machine resource may be configured for choreographing a bare machine service by heat based on OpenStack in the prior art, thereby achieving the purposes of deploying the target physical machine and managing the target physical machine and having no affection on orchestration for related functions of the cloud host.

Additionally, as the added physical machine resource OS:Nova:Host needs to choreograph the target physical machine resource, and the physical machine has some features different from the cloud host, such as the feature of not supporting a suspend/resume operation, a method for inheriting the features of the involved physical machine from OS:Nova:Server needs to be modified to obtain the target physical machine resource corresponding to the target physical machine.

It needs to be noted that Nova is configured for managing the life cycle of the virtual machine, Ironic is configured for managing the life cycle of the physical machine, and Ironic is configured for providing an application programming interface (API) interface of managing the physical machine for nova; and therefore, the bottom driver of Ironic needs to be configured according to the features of the target physical machine. For nova, a required invoking process of invoking the bottom driver for performing service orchestration for the target physical machine by Ironic is the same as that for the virtual machine, the creation of examples are executed by interfaces of nova, but only a bottom nova-scheduler driver and a bottom nova-compute driver are different, wherein the bottom driver of the virtual machine adopts a virtualization technology, and the physical machine adopts a preboote xecute environment (PXE) technology and an intelligent platform management interface (IPMI) technology.

When heat is configured to send an instruction of performing service orchestration for the target physical machine to nova, Ironic is invoked by Nova to perform service orchestration for the target physical machine by utilizing the target physical machine resource when Ironic operates; and in other words, Ironic is invoked by nova, and Ironic is configured to simulate a virtualized driver of nova, so as to realize a virtualized driver based on Ironic.

The service orchestration method of the physical machine, which is provided by the embodiment of the present disclosure, includes: creating the physical machine resource inheriting all attributes of the cloud host, and modifying the physical machine resource according to the features of the target physical machine to obtain the target physical machine resource; then configuring the bottom driver of Ironic according to the features of the target physical machine; and invoking Ironic by nova to perform service orchestration for the target physical machine by utilizing the target physical machine resource when Ironic operates. Ironic is a project of performing service orchestration for the physical machine in OpenStack, and Ironic is invoked by nova to perform service orchestration for the target physical machine by utilizing the target physical machine resource when Ironic operates, thereby realizing service orchestration for the physical machine; in addition, compared with a method of setting the target physical machine resource in the prior art, the target physical machine resource in the method of the present disclosure is obtained by inheriting all attributes of the cloud host, and modifying the physical machine resource according to the features of the target physical machine, thereby greatly omitting design details of setting the target physical machine resource and simplifying the setting process; and as the attributes of the cloud host are inherited, orchestration for related functions of the cloud host is not affected, and the system stability is guaranteed relatively.

Based on the above embodiment, the technical solution is further described and optimized in the embodiment; in the embodiment, the step of creating the physical machine resource inheriting all attributes of the cloud host, and modifying the physical machine resource according to the features of the target physical machine to obtain the target physical machine resource, includes:

creating the physical machine resource inheriting all attributes of the cloud host; and modifying the physical machine resource according to the features of the target physical machine, and rewriting a handle_create method, a handle_suspend and handle_resume method and a check_suspend_complete and check_resume_complete method to obtain the target physical machine resource, wherein the handle_create method, the handle_suspend and handle_resume method and the check_suspend_complete and check_resume_complete method are processing functions of a life cycle event.

In the embodiment, the physical machine resource is modified according to the features of the target physical machine after the physical machine resource inheriting all attributes of the cloud host is created; and the target physical machine has some features different from the cloud host, such as the feature of not supporting a suspend/resume operation, the method for inheriting the features of the involved physical machine from OS:Nova:Server needs to be rewritten:

1. rewritting the handle_create method, wherein a cure parameter config_driver is true, so as to be independent of a metadata service; and ConfigDrive is configured for injecting a file and injecting a script, so as to realize initialization operations such as changing a password, configuring a network, configuring a name of a physical host and the like;

2. rewriting the handle_suspend and handle_resume method, so that the return thereof is a constant character string, and an operation is not performed; and 3. rewritting the check_suspend_complete and check_resume_complete method, so that the return thereof is true always, and the method has no affection on the target physical machine resource.

It needs to be noted that in other implementation manners, other attribute information may also be added/deleted/modified according to the features of the target physical machine, which is not limited in the embodiment.

It may be seen that the physical machine resource is modified according to the manner of the embodiment, so that the target physical machine resource configured for performing service orchestration for the target physical machine is obtained, contents to be modified are less, and the operation is simple.

Based on the above embodiment, the technical solution is further described and optimized in the embodiment; and before invoking Ironic by nova to perform service orchestration for the target physical machine by utilizing the target physical machine resource when Ironic operates, the embodiment further includes:

a step of performing identity verification for a invoke instruction sent for nova by Ironic, and invoking Ironic by nova after identity verification passes to perform service orchestration for the target physical machine by utilizing the target physical machine resource when Ironic operates.

In the embodiment, identity verification is performed for nova firstly by Ironic according to the invoke instruction sent by nova when the invoke instruction is sent to Ironic by nova before the step of invoking Ironic by nova to perform service orchestration for the target physical machine. In the embodiment, identity verification may include: verifying the validity and safety of the nova and verifying that whether the nova is a preassigned nova; and in the embodiment, the type of identity verification is not limited, and a corresponding verification mode is also not limited, and for example, whether the invoke instruction sent by nova includes preset verification information or a preset digital certificate and the like may be verified.

It may be understood that in the embodiment, identity verification is further performed for nova, so as to further guarantee the safety and reliability of performing service orchestration for the target physical machine.

Based on the above embodiment, the technical solution is further described and optimized in the embodiment; and after invoking Ironic by nova to perform service orchestration for the target physical machine by utilizing the target physical machine resource when Ironic operates, the embodiment further includes:

setting label information for the target physical machine completing service orchestration.

In the embodiment, the label information is further set for the target physical machine after Ironic is invoked by nova to perform service orchestration for the target physical machine by utilizing the target physical machine resource when Ironic operates, i.e. after the step of performing service orchestration for the target physical machine is completed. The label information may be text information or digital information or character information and so on, which are not limited in the embodiment, and the purpose thereof is to set a label for the target physical machine to distinguish the physical machine completing service orchestration and a physical machine not completing service orchestration, so that the user acquires a service orchestration state of each physical machine more conveniently and more intuitively subsequently.

Based on the above embodiment, the technical solution is further described and optimized in the embodiment; and after invoking Ironic by nova to perform service orchestration for the target physical machine by utilizing the target physical machine resource when Ironic operates, the embodiment further includes:

writing an operation record of performing service orchestration for the target physical machine into an operation log.

In the embodiment, operation time for realizing the operation of service orchestration, a unique identification information of the target physical machine and other information are further acquired, and then the information is written into the operation log after Ironic is invoked by nova to perform service orchestration for the target physical machine by utilizing the target physical machine resource when Ironic operates, i.e. after the operation of performing service orchestration for the target physical machine is completed. It needs to be noted that in the actual operation, the recording mode may be a text form or an excel form or a database table form, which are not limited in the embodiment and are selected according to actual requirements.

In the embodiment, the operation record of performing service orchestration for the target physical machine is further written into the operation log, so as to be convenient for the user to check operation situations of performing service orchestration for each target physical machine, so as to further enhance user experience.

Based on the above embodiment, the technical solution is further described and optimized in the embodiment; and after invoking Ironic by nova to perform service orchestration for the target physical machine by utilizing the target physical machine resource when Ironic operates, the embodiment further includes:

displaying configuration information corresponding to service orchestration for the target physical machine.

In the embodiment, the current configuration information corresponding to service orchestration for the target physical machine is displayed by a preset display device after Ironic is invoked by nova to perform service orchestration for the target physical machine by utilizing the target physical machine resource when Ironic operates. The configuration information includes the type and the model of an operation system, the capacity, the type and the model of a hard disk and other information, and the type of the configuration information is not limited in the embodiment. In the actual operation, a display form is not limited; and in the embodiment, the type of the display device is also not limited, and for example, the display device may be a liquid crystal display (LCD) or a touch screen and so on.

It may be seen that in the embodiment, the configuration information corresponding to service orchestration for the target physical machine is further displayed, so as to be convenient for the user to inquire and acquire situations of service orchestration for the target physical machine more conveniently.

Based on the above embodiment, the technical solution is further described and optimized in the embodiment; and after invoking Ironic by nova to perform service orchestration for the target physical machine by utilizing the target physical machine resource when Ironic operates, the embodiment further includes:

sending corresponding prompt information.

In the embodiment, a prompt device is further triggered to send the corresponding prompt information after Ironic is invoked by nova to perform service orchestration for the target physical machine by utilizing the target physical machine resource when Ironic operates. It needs to be noted that the prompt device may be a buzzer and/or an indicating light and/or a displayer, and the corresponding prompt information such as a humming sound/a flasher/displayed texts or images and the like is sent by the prompt device such as the buzzer/the indicating light/the displayer and the like to intuitively prompt that the user has completed the operation of performing service orchestration for the target physical machine and may perform other operations for the target physical machine, so as to further enhance user experience.

The embodiments of the service orchestration method of the physical machine, which is provided by the present disclosure, are described in details in the above. The present disclosure also provides the service orchestration device and apparatus of the physical machine corresponding to the method, and the computer-readable storage medium; and as the embodiments of the device, the apparatus and the computer-readable storage medium correspond to the embodiments of the method, the embodiments of the device, the apparatus and the computer-readable storage medium may refer to the descriptions for the embodiments of the method, which are not repeated here.

Figure 3:
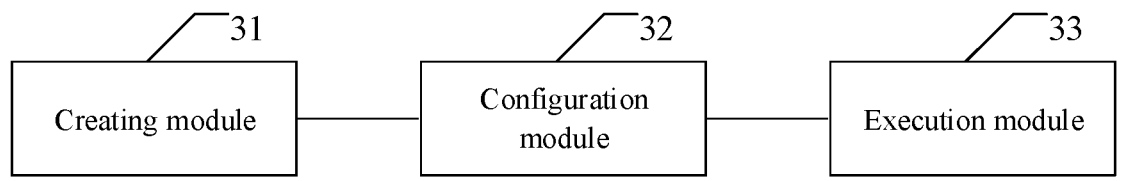
FIG. 3 is a structural diagram of a service orchestration device of a physical machine, which is provided by an embodiment of the present disclosure.

FIG. 3 is a structure diagram of the service orchestration device of the physical machine, which is provided by an embodiment of the present disclosure. As shown in FIG. 3, the service orchestration device of the physical machine includes:

a creating module 31 configured for creating the physical machine resource inheriting all attributes of the cloud host, and modifying the physical machine resource according to the features of a target physical machine to obtain the target physical machine resource;

a configuration module 32 configured for configuring the bottom driver of Ironic according to the features of the target physical machine; and an execution module 33 configured for invoking Ironic by nova to perform service orchestration for the target physical machine by utilizing the target physical machine resource when Ironic operates.

The service orchestration device of the physical machine, which is provided by the embodiment of the present disclosure, has the beneficial effects of the above service orchestration method of the physical machine.

In an embodiment of the present disclosure, the service orchestration device of the physical machine further includes:

a verification module configured for performing identity verification for a invoke instruction sent for nova by Ironic, and invoking the execution module after identity verification passes.

In an embodiment of the present disclosure, the service orchestration device of the physical machine further includes: a label setting module configured for setting the label information for the target physical machine completing service orchestration.

In an embodiment of the present disclosure, the service orchestration device of the physical machine further includes:

a recording module configured for writing the operation record of performing service orchestration for the target physical machine into the operation log.

In an embodiment of the present disclosure, the service orchestration device of the physical machine further includes: a display module configured for displaying the configuration information corresponding to service orchestration for the target physical machine.

In an embodiment of the present disclosure, the service orchestration device of the physical machine further includes:

a prompt module configured for sending the corresponding prompt information after Ironic is invoked by nova to perform service orchestration for the target physical machine by utilizing the target physical machine resource when Ironic operates.

Figure 4:
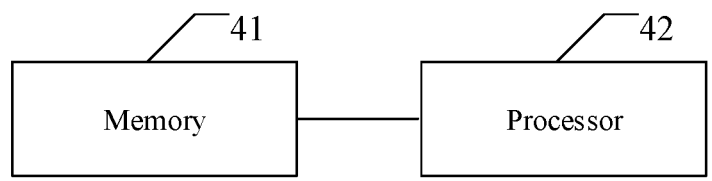
FIG. 4 is a structural diagram of a service orchestration apparatus of a physical machine, which is provided by an embodiment of the present disclosure.

FIG. 4 is a structure diagram of the service orchestration apparatus of the physical machine, which is provided by an embodiment of the present disclosure. As shown in FIG. 4, the service orchestration apparatus of the physical machine includes:

a memory 41 configured for storing computer programs; and a processor 42 configured for executing the computer programs to implement the steps of the above service orchestration method of the physical machine.

The service orchestration apparatus of the physical machine, which is provided by the embodiment of the present disclosure, has the beneficial effects of the above service orchestration method of the physical machine.

In order to solve the above technical problems, the present disclosure also provides the computer-readable storage medium; the computer programs are stored on the computer-readable storage medium; and the computer programs are executed by the processor to implement the steps of the above service orchestration method of the physical machine.

The computer-readable storage medium provided by the embodiment of the present disclosure has the beneficial effects of the above service orchestration method of the physical machine.

The service orchestration method, device and apparatus of the physical machine, and the computer-readable storage medium, which are provided by the present disclosure, are introduced in details in the above. In the text, the embodiments are applied to explain the principles and implementation manners of the present disclosure, and the above descriptions for the embodiments are only configured for helping understand the method of the present disclosure and the core thought thereof. It should be noted that those ordinary skilled in the art may also make several improvements and modifications to the present disclosure on the premise of not departing from the principles of the present disclosure, and the improvements and the modifications also fall into the protection scope of the claims of the present disclosure.

Each embodiment in the specification is described in a progressive way. Each embodiment focuses on the differences from other embodiments. The same and similar parts between each embodiment may be seen in each other. For the device disclosed in the embodiment, because it corresponds to the method of open embodiment, the description is relatively simple, and the relevant places may be seen in the method section.

A person skilled in the art may further realize that the units and algorithm steps of each example described in combination with the examples disclosed herein may be realized by electronic hardware, computer software or a combination of the two. In order to clearly explain the interchangeability of hardware and software, the composition and steps of each example have been described generally according to the functions in the above instructions. Whether these functions are implemented in hardware or software depends on the application and design constraints of the technical solution. A person skilled in the art may use different methods to implement the described functions for each application, but this implementation should not be considered beyond the scope of the present application.

The invention claimed is:

1. A service orchestration method of a physical machine, comprising:

creating a physical machine resource inheriting all attributes of a cloud host, and modifying the physical machine resource according to features of a target physical machine to obtain a target physical machine resource;

configuring a bottom driver of Ironic according to the features of the target physical machine; and invoking Ironic by nova to perform service orchestration for the target physical machine by utilizing the target physical machine resource when Ironic operates;

wherein creating the physical machine resource inheriting all attributes of the cloud host, and modifying the physical machine resource according to the features of the target physical machine to obtain the target physical machine resource comprises:

creating the physical machine resource inheriting all attributes of the cloud host; and modifying the physical machine resource according to the features of the target physical machine, and rewriting a handle create method, a handle suspend and handle resume method and a check suspend complete and check resume complete method to obtain the target physical machine resource;

wherein modifying the physical machine resource according to the features of the target physical machine, and rewriting a handle create method, a handle suspend and handle resume method and a check suspend complete and check resume complete method to obtain the target physical machine resource comprises:

rewriting the handle create method, curing a parameter of config driver is true and injecting a file and a script by the config driver to complete initialization operations;

rewriting the handle suspend and handle resume method, so that the handle suspend and handle resume method returns a constant character string, and an operation is not performed; and rewriting the check suspend complete and check resume complete method, so that the return value of the check suspend complete and check resume complete method is true.

2. The method according to claim 1, wherein before invoking Ironic by nova to perform service orchestration for the target physical machine by utilizing the target physical machine resource when Ironic operates, the method further comprises:

a step of performing identity verification for a invoke instruction sent for nova by Ironic, and invoking Ironic by nova after identity verification passes to perform service orchestration for the target physical machine by utilizing the target physical machine resource when Ironic operates.

3. The method according to claim 2, wherein the identity verification comprises: verifying the validity and safety of the nova and verifying that whether the nova is a preassigned nova.

4. The method according to claim 2, wherein a verification mode of the identity verification comprises: verifying whether the invoke instruction sent by nova comprises preset verification information or a preset digital certificate.

5. The method according to claim 1, wherein after invoking Ironic by nova to perform service orchestration for the target physical machine by utilizing the target physical machine resource when Ironic operates, the method further comprises:

setting label information for the target physical machine completing service orchestration.

6. The method according to claim 5, wherein the label information comprises at least one of text information and character information.

7. The method according to claim 1, wherein after invoking Ironic by nova to perform service orchestration for the target physical machine by utilizing the target physical machine resource when Ironic operates, the method further comprises:

writing an operation record of performing service orchestration for the target physical machine into an operation log.

8. The method according to claim 1, wherein after invoking Ironic by nova to perform service orchestration for the target physical machine by utilizing the target physical machine resource when Ironic operates, the method further comprises:

displaying configuration information corresponding to service orchestration for the target physical machine.

9. The method according to claim 8, wherein the configuration information comprises a type and a model of an operation system, a capacity, a type and a model of a hard disk.

10. The method according to claim 1, wherein after invoking Ironic by nova to perform service orchestration for the target physical machine by utilizing the target physical machine resource when Ironic operates, the method further comprises:

sending corresponding prompt information.

11. A service orchestration apparatus of a physical machine, comprising:

a processor; and a memory, storing a computer program that is executed by the processor, and upon execution by the processor, is configured to cause the processor to implement operations comprising:

creating a physical machine resource inheriting all attributes of a cloud host, and modifying the physical machine resource according to features of a target physical machine to obtain a target physical machine resource;

configuring a bottom driver of Ironic according to the features of the target physical machine; and invoking Ironic by nova to perform service orchestration for the target physical machine by utilizing the target physical machine resource when Ironic operates;

the operation of creating the physical machine resource inheriting all attributes of the cloud host, and modifying the physical machine resource according to the features of the target physical machine to obtain the target physical machine resource comprises:

creating the physical machine resource inheriting all attributes of the cloud host; and modifying the physical machine resource according to the features of the target physical machine, and rewriting a handle create method, a handle suspend and handle resume method and a check suspend complete and check resume complete method to obtain the target physical machine resource;

wherein modifying the physical machine resource according to the features of the target physical machine, and rewriting a handle create method, a handle suspend and handle resume method and a check suspend complete and check resume complete method to obtain the target physical machine resource comprises:

rewriting the handle create method, curing a parameter of config driver is true and injecting a file and a script by the config driver to complete initialization operations;

rewriting the handle suspend and handle resume method, so that the handle suspend and handle resume method returns a constant character string, and an operation is not performed; and rewriting the check suspend complete and check resume complete method, so that the return value of the check suspend complete and check resume complete method is true.

12. The service orchestration apparatus of a physical machine according to claim 11, wherein before invoking Ironic by nova to perform service orchestration for the target physical machine by utilizing the target physical machine resource when Ironic operates, the method further comprises:

a step of performing identity verification for a invoke instruction sent for nova by Ironic, and invoking Ironic by nova after identity verification passes to perform service orchestration for the target physical machine by utilizing the target physical machine resource when Ironic operates.

13. The service orchestration apparatus of a physical machine according to claim 11, wherein after invoking Ironic by nova to perform service orchestration for the target physical machine by utilizing the target physical machine resource when Ironic operates, the method further comprises:

setting label information for the target physical machine completing service orchestration.

14. The service orchestration apparatus of a physical machine according to claim 11, wherein after invoking Ironic by nova to perform service orchestration for the target physical machine by utilizing the target physical machine resource when Ironic operates, the method further comprises:

writing an operation record of performing service orchestration for the target physical machine into an operation log.

15. The service orchestration apparatus of a physical machine according to claim 11, wherein after invoking Ironic by nova to perform service orchestration for the target physical machine by utilizing the target physical machine resource when Ironic operates, the method further comprises:

writing an operation record of performing service orchestration for the target physical machine into an operation log.

16. The service orchestration apparatus of a physical machine according to claim 11, wherein after invoking Ironic by nova to perform service orchestration for the target physical machine by utilizing the target physical machine resource when Ironic operates, the method further comprises:

displaying configuration information corresponding to service orchestration for the target physical machine.

17. The service orchestration apparatus of a physical machine according to claim 11, wherein after invoking Ironic by nova to perform service orchestration for the target physical machine by utilizing the target physical machine resource when Ironic operates, the method further comprises:

sending corresponding prompt information, wherein after invoking Ironic by nova to perform service orchestration for the target physical machine by utilizing the target physical machine resource when Ironic operates, the method further comprises:

displaying configuration information corresponding to service orchestration for the target physical machine.

18. A non-transitory computer-readable storage medium, storing a computer program that is executed by a processor, and upon execution by the processor, is configured to cause the processor to implement operations comprising creating a physical machine resource inheriting all attributes of a cloud host, and modifying the physical machine resource according to features of a target physical machine to obtain a target physical machine resource;

configuring a bottom driver of Ironic according to the features of the target physical machine; and invoking Ironic by nova to perform service orchestration for the target physical machine by utilizing the target physical machine resource when Ironic operates;

the operation of creating the physical machine resource inheriting all attributes of the cloud host, and modifying the physical machine resource according to the features of the target physical machine to obtain the target physical machine resource comprises:

creating the physical machine resource inheriting all attributes of the cloud host; and modifying the physical machine resource according to the features of the target physical machine, and rewriting a handle create method, a handle suspend and handle resume method and a check suspend complete and check resume complete method to obtain the target physical machine resource;

wherein modifying the physical machine resource according to the features of the target physical machine, and rewriting a handle create method, a handle suspend and handle resume method and a check suspend complete and check resume complete method to obtain the target physical machine resource comprises:

rewriting the handle create method, curing a parameter of config driver is true and injecting a file and a script by the config driver to complete initialization operations;

rewriting the handle suspend and handle resume method, so that the handle suspend and handle resume method returns a constant character string, and an operation is not performed; and rewriting the check suspend complete and check resume complete method, so that the return value of the check suspend complete and check resume complete method is true.

* * * * *